United States Patent [19]

Bair

[11] Patent Number: 5,078,651

[45] Date of Patent: Jan. 7, 1992

[54] SOFT-START/POSITIVE DRIVE COUPLING

[75] Inventor: Thomas C. Bair, Wrightsville, Pa.

[73] Assignee: Armstrong World Industries, Inc., Lancaster, Pa.

[21] Appl. No.: 124,077

[22] Filed: Nov. 23, 1987

[51] Int. Cl.$^5$ .............................. F16D 3/10
[52] U.S. Cl. ................................. 464/160
[58] Field of Search ............... 192/52, 53 H, 71, 108; 464/35, 36, 37, 38, 160

[56] References Cited

U.S. PATENT DOCUMENTS

| 865,486 | 9/1907 | Gannon | 464/36 |
|---|---|---|---|
| 1,657,274 | 1/1928 | Niedhammer | 464/36 X |
| 1,669,507 | 5/1928 | Dickson | 310/78 |
| 1,809,512 | 6/1931 | Defays et al. | 310/78 |
| 4,661,085 | 4/1987 | Carli | 464/160 |

FOREIGN PATENT DOCUMENTS 257168  3/1949  Switzerland ..................... 464/36

Primary Examiner—Daniel P. Stodola

[57] ABSTRACT

A coupling is in two parts. One part is connected to the element to be driven and that part is a flat-face, circular member with three spaced grooves on its face and three spaced grooves on its circular edge. The second part is connected to the drive element and is a three jaw chuck with wedges on the jaws to engage the grooves on the circular edge of the first part. The three jaws have spring-biased projections that engage the grooves on the face of the first part to initially have the second part drive the first part.

1 Claim, 1 Drawing Sheet

SOFT-START/POSITIVE DRIVE COUPLING

BACKGROUND OF THE INVENTION

1. Field of the Invention

The invention is directed to a coupling and, more particularly, to a coupling that has a soft-start due to incremental impacts between the driving and driven members and then, subsequently, a positive engagement of the driving and driven members.

2. Description of the Prior Art

U.S. Pat. No. 865,486 discloses a gear 2 and a shaft 1 that are coupled together through an annular series of spring-pressed balls 12. The structure in the patent operates as an overload clutch and not as a start-up clutch.

Numerous examples are available in the prior art of overload clutches utilizing recesses and springpress balls to function as an overload device.

SUMMARY OF THE INVENTION

A soft-start positive drive coupling is formed from a driven element and a driving element. The driving element is a three-jaw universal chuck. On the face of the universal chuck are ball-shaped projections which will engage in grooves of the driven member. The rotational movement of the driving element is transmitted by the ball-shaped projections and grooves to the driven element, but the shock of engagement of the driving and driven elements is greatly lessened by the projection slipping out of one groove and into the adjacent groove until rotational speed of the driven element matches the rotational speed of the driving element. The driven element has an edge with grooves therein and when the rotational movement of the driving and driven elements are the same the three-jaws of the universal chuck engage the grooves in the edge of the driven member and positively lock together the driven member and the driving member. BRIEF DESCRIPTION OF THE DRAWINGS FIG. 1 is a perspective view of the driven member;

DESCRIPTION OF THE PREFERRED EMBODIMENT

Figure 3:
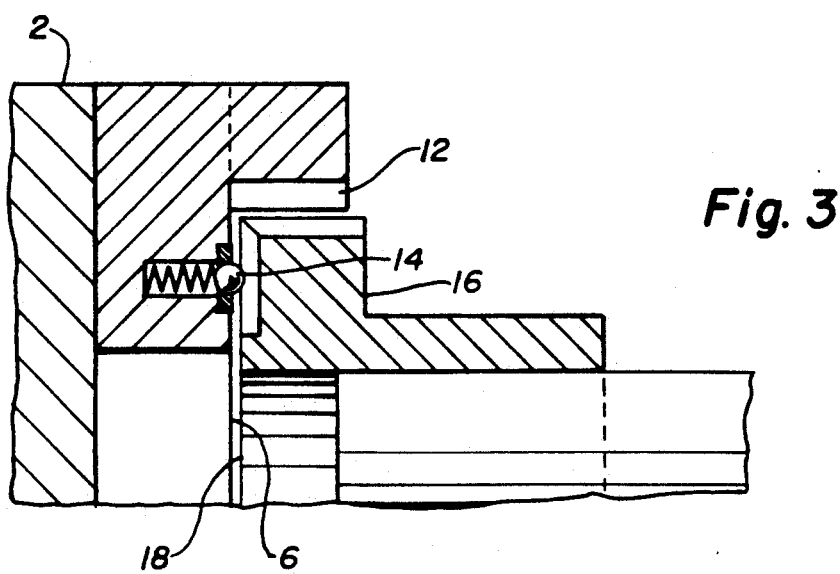
FIG. 3 is a partial view in section showing the engagment of the driving member and the driven member.

The soft-start positive drive coupling comprises a drive element 2 that is a three-jaw universal chuck. This is the driving element for the coupling. The jaws 4 of the chuck are moveable from a non-engagement position to an engagement position. The chuck has a face surface 6 and each of the jaws 4 have a first portion 8 which projects above the face surface 6 of the chuck. The second portion 10 of each jaw is positioned below the face surface 6 of the chuck. Each of the jaws 4 are guided to be moved toward and away from the center of the face surface 6 of the chuck so that the jaws may move towards the center of the chuck into an engagement position and away form the center of the chuck to a nonengagement position. The first portion 8 of each jaw projecting above the face surface 6 has a wedge-shaped member 12 positioned on the jaw perpendicular to the face surface and the wedge-shape face of the wedge-shaped member 12 faces the center of the face surface 6. The second portion 10 of each jaw, below or even with the face surface 6 of the chuck, has a spring bias ball-shaped projection 14 extending out beyond the face surface. The ball-shaped projection is springbiased as can be seen in FIG. 3 and it is located in the second portion 10 of the jaw 4. The ball-shaped projection is positioned closely adjacent the wedge-shaped member 12 and the ball-shaped projection has its axis of movement perpendicular to the face surface. The wedge-shape of the wedge-shaped member 12 faces the axis of movement of the ball-shaped projection.

Figure 1:
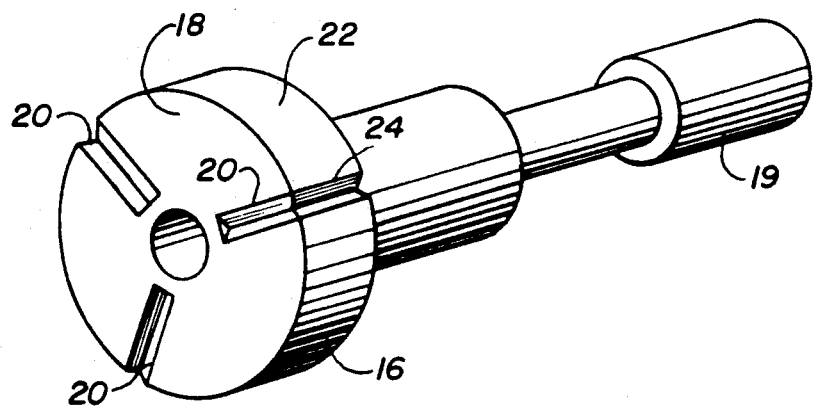
Figure 2:
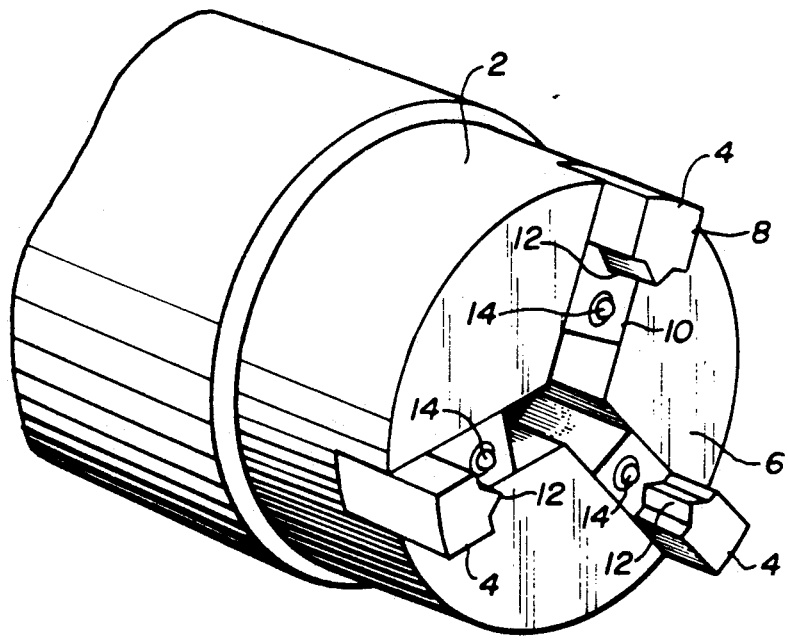
FIG. 2 is a perspective view of the driving member.

The second part of the coupling is the driven element 16 that is connected to the means 19 to be driven by the drive element 2. The driven element has a disc-shaped face with a face surface 18 parallel to and spaced slightly from the face surface of the drive element as shown in FIG. 3. The face surface 18 of the driven element 16 has three grooves 20 equally spaced on the perimeter of the face with each groove extending from the perimeter of the face towards the center of the face surface 18. In operation, the grooves 20 are engaged by the ball-shaped projections 14 of the drive element whereby rotational movement of the drive element is transmitted by the ball-shaped projections 14 and grooves 20 to the driven element, but the shock of engagement of the drive and driven elements is greatly lessened by the projections slipping out of one groove and into the adjacent groove until the rotational speed of the driven element matches the rotational speed of the drive element. This is what provides the soft-start feature to the coupling invention herein.

the face surface of the driven element in FIG. 1 has an edge 22 perpendicular thereto and the edge has three grooves 24 therein with each groove positioned at the perimeter of and at a right angle to the grooves 20 in the face surface. The grooves in the edge of the driven element are engageable by the wedge-shaped projections 12 on the jaws 4 of the drive element when the rotational speed of the driven element matches the rotational speed of the drive element. This occurs when the face surface grooves and ball projections are not slipping out of engagement. The three jaws 4 of the drive element are moved from their non-engagement position to an engagement position with the wedge-shaped members or projections 12 engaging the grooves 24 in the edge of the driven element to positively lock together the drive and driven elements.

What is claimed is:

1. A soft-start positive drive coupling comprising:
   a) a drive element that is a three jaw universal chuck, said jaws being movable from a nonengagement position to an engagement position;
   b) the chuck having a face surface and each said jaw having a first portion of each jaw projecting above the face surface, and a second portion of each jaw positioned even with the face surface of the chuck, said jaws being guided to be moved toward and away from the center of the face surface to move toward an engagement position and away to a non-engagement position;
   c) the first portion of each jaw projecting above the face surface having a wedge-shaped member positioned on the jaw perpendicular to the face surface and the wedge-shape of said member facing the center of the face surface;
   d) the second portion of each jaw even with the face surface of the chuck having a spring bias ball-shaped projection therein extending out beyond the face surface and positioned closely adjacent the wedge-shaped member, said ball-shaped projection having its axis of movement perpendicular to the face surface and the wedge-shape of the wedge-shaped member facing the axis of movement of the ball-shaped projection;
e) a driven element that is connected to a means to be driven by the drive element, said drive element having a disc-shaped face with the face surface thereof parallel to and spaced slightly from the face surface of the drive element;
f) said face surface of the driven element having three grooves equally spaced on the perimeter of the face with each groove extending from the perimeter of the face toward the center of the face surface, said grooves being engaged by the ball-shaped projections of the drive element whereby rotational movement of the drive element is tramsmitted by the ball-shaped projections and grooves to the driven element, but shock of engagement of the drive and driven elements is greatly lessened by the projections slipping out of one groove and into the adjacent groove until the rotational speed of the driven element matches the rotational speed of the drive element; and
g) said face surface of the driven element having an edge perpendicular thereto and the edge having three grooves therein with each groove positioned at the perimeter end of and at a right angle to the grooves in the face surface, said grooves in the edge of the driven element being engageable by the wedge-shaped projections on the jaws of the drive element whereby, when the face surface grooves and ball-shaped projections are not slipping out of engagement and the drive and driven elements are the same rotational speed, the three jaws of the drive element are moved form their non-engagement position to an engagement position with the three jaw projections engaging the three grooves in the edge of the driven element to positively lock together the drive and driven elements.

* * * * *